US010270288B2

(12) United States Patent
Rejman et al.

(10) Patent No.: US 10,270,288 B2
(45) Date of Patent: Apr. 23, 2019

(54) HAND TOOL CASE HOLDING DEVICE

(71) Applicants: Marcin Rejman, Waiblingen (DE); Volker Amann, Augsburg (DE); Guenter Lohr, Leinfelden-Echterdingen (DE); Juergen Mack, Goeppingen (DE); Brett Huber, Arlington Heights, IL (US); Christian Heine, Mt. Prospect, IL (US); Friederike Dietzel, Stuttgart (DE)

(72) Inventors: Marcin Rejman, Waiblingen (DE); Volker Amann, Augsburg (DE); Guenter Lohr, Leinfelden-Echterdingen (DE); Juergen Mack, Goeppingen (DE); Brett Huber, Arlington Heights, IL (US); Christian Heine, Mt. Prospect, IL (US); Friederike Dietzel, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 76 days.

(21) Appl. No.: 14/359,542

(22) PCT Filed: Nov. 9, 2012

(86) PCT No.: PCT/EP2012/072296
§ 371 (c)(1),
(2) Date: May 20, 2014

(87) PCT Pub. No.: WO2013/075956
PCT Pub. Date: May 30, 2013

(65) Prior Publication Data
US 2015/0108943 A1 Apr. 23, 2015

(30) Foreign Application Priority Data
Nov. 22, 2011 (DE) .................. 10 2011 086 876

(51) Int. Cl.
*B25H 3/02* (2006.01)
*H02J 7/00* (2006.01)
*H02J 50/10* (2016.01)

(52) U.S. Cl.
CPC .............. *H02J 50/10* (2016.02); *B25H 3/02* (2013.01); *H02J 7/0042* (2013.01)

(58) Field of Classification Search
CPC ................................ B25H 3/00; H02J 50/10
(Continued)

(56) References Cited

U.S. PATENT DOCUMENTS 6,218,796 B1  4/2001  Kozlowski
7,462,951 B1 * 12/2008  Baarman ................. B25H 3/02
                                                        307/150
(Continued)

FOREIGN PATENT DOCUMENTS

CN  1296628 A  5/2001
CN  1771570 A  5/2006
(Continued)

OTHER PUBLICATIONS

International Search Report for PCT/EP2012/072296, dated Jun. 6, 2013.

*Primary Examiner* — Drew A Dunn
*Assistant Examiner* — Harry O'Neill-Becerril
(74) *Attorney, Agent, or Firm* — Norton Rose Fulbright US LLP; Gerard Messina

(57) ABSTRACT

A hand tool case holding device includes at least one charging coil, a case accommodating area and a holding device housing, which includes a first outer side facing toward the case accommodating area. The holding device housing includes at least one second outer side, (a) which, in at least one operating state, faces toward the case accommodating area, (b) which is aligned essentially perpendicu-
(Continued)

larly to the first outer side, and (c) on which the charging coil is situated.

12 Claims, 7 Drawing Sheets

(58) Field of Classification Search
USPC .......................................................... 320/108
See application file for complete search history.

(56) References Cited

U.S. PATENT DOCUMENTS

| 2009/0212737 A1* | 8/2009 | Johnson | ................. | A47B 96/02 |
| | | | | 320/108 |
| 2011/0298418 A1* | 12/2011 | Yeh | ....................... | G06F 1/1635 |
| | | | | 320/108 |

FOREIGN PATENT DOCUMENTS

| CN | 1922700 A | 2/2007 | | |
| DE | 10 2008 058 007 | 4/2010 | | |
| DE | 102008058007 B3 * | 4/2010 | ......... | B65D 21/0228 |
| EP | 0 533 247 | 3/1993 | | |
| EP | 1 563 965 | 8/2005 | | |
| EP | 2 289 671 | 3/2011 | | |
| KR | 2011-0107728 | 10/2011 | | |

\* cited by examiner

HAND TOOL CASE HOLDING DEVICE

FIELD OF THE INVENTION

The present invention is directed to a hand tool case holding device including at least one charging coil, a case accommodating area, and a holding device housing. The holding device housing includes a first outer side facing toward the case accommodating area. The holding device housing also includes at least one second outer side on which the charging coil is situated. The at least one second outer side faces toward the case accommodating area in at least one operating state, and is aligned at least essentially perpendicularly to the first outer side.

BACKGROUND

A hand tool case holding device conventionally includes at least one charging coil, a case accommodating area, and a holding device housing, which includes a first outer side facing toward the case accommodating area.

SUMMARY

According to example embodiments of the present invention, a hand tool case holding device includes at least one charging coil, a case accommodating area, and a holding device housing. The holding device housing includes a first outer side facing toward the case accommodating area. The holding device housing also includes at least one second outer side on which the charging coil is situated. The at least one second outer side faces toward the case accommodating area in at least one operating state, and is aligned at least essentially perpendicularly to the first outer side.

In particular, a "charging coil" is to be understood as a coil which receives and/or transmits energy during a charging operation. The charging coil of the hand tool case holding device preferably transmits, during a charging operation, energy which a charging coil of a hand tool and/or advantageously a hand tool battery situated in the case accommodating area receives. The charging coil preferably includes at least one coil winding and in particular a coil core. Alternatively or additionally, the charging coil of the hand tool case holding device could be implemented as an air-core coil. The charging coil of the hand tool case holding device is preferably implemented as a printed conductor on a circuit board or particularly preferably as a wound coil.

A "case accommodating area" is to be understood in particular as an area in which a hand tool case is situated at least during a charging operation. A holding device housing of the hand tool case holding device preferably delimits the case accommodating area on at least two sides, preferably using the first and the second outer sides.

In particular, a "hand tool case" is to be understood as a case which, in a closed state, delimits a tool accommodating area, for example, in a shock-proof, moisture-proof, and/or dust-proof manner. The hand tool case preferably delimits the tool accommodating area at least partially for accommodating a hand tool and/or a hand tool battery. The hand tool case preferably includes at least one positioning and/or fixing component for positioning and/or fixing a hand tool, a hand tool including an attached hand tool battery, and/or particularly preferably a hand tool battery. The hand tool case is preferably magnetically passive and/or advantageously electrically passive. In particular, the hand tool case does not include any electrical equipment. Alternatively or additionally, the hand tool case could include a charging coil and/or advantageously a magnetic field conductor, which receives the energy of the charging coil and relays it in a hard-wired and/or magnetic way to a hand tool battery. The hand tool case is preferably implemented corresponding to the hand tool case provided in the publication DE 10 2008 058 007 B3, but, in particular, includes a hand tool accommodating area and/or a hand tool battery accommodating area, which is provided for the purpose of accommodating an inductively chargeable hand tool battery during a charging operation.

In particular, a "hand tool" is to be understood as a portable tool as understood by those skilled in the art, but advantageously as a drill, a drill hammer, a percussion hammer, a saw, a plane, a screwdriver, a milling machine, a grinder, an angle grinder, a gardening tool, a construction site measuring device, and/or a multifunction tool.

In particular, a "holding device housing" is to be understood as a unit which, in an operationally ready state, mechanically connects at least the first outer side, the second outer side, and the charging coil. The holding device housing preferably encloses an interior chamber, in which advantageously a charging electronic system of the hand tool case holding device is situated.

An "outer side" is to be understood in particular as a plane which is spanned by an average extension of an outer surface. Areas of the outer surface which span the outer side preferably differ in their alignment by less than 120°, advantageously by less than 60°, particularly advantageously by less than 30°. In particular, the extension of the outer surface which spans the outer side extends more than 10 cm$^2$, advantageously more than 50 cm$^2$, particularly advantageously more than 250 cm$^2$.

In particular, the term "facing toward" is to be understood to mean that a vertical of the outer side, which intersects with the outer side, intersects with the case accommodating area.

The phrase "essentially perpendicular" is to be understood in particular to mean that the first outer side and the second outer side are arranged at an angle to each other, where the angle is between 45° and 135°, advantageously between 60° and 120°, particularly advantageously between 75° and 105°. The angle is preferably 90°. The angle is preferably situated on a plane which is aligned perpendicularly to the two outer sides.

"Situated on the outer side" is to be understood in this context in particular to mean that the charging coil is situated spaced apart from the second outer side at least partially by less than 20 mm, advantageously less than 10 mm, particularly advantageously less than 5 mm.

Particularly stable fastening of a hand tool case in the case accommodating area may be achieved by the embodiment according to the present invention of the hand tool case holding device. Furthermore, particularly comfortable positioning of the hand tool case in an optimum position for a charging operation is possible.

In one further embodiment, it is provided that the second outer side is provided for the purpose of causing a support force parallel to the first outer side, whereby stable fastening may be achieved in the case of an advantageous case shape. In particular, user-friendly introduction of the hand tool case into the case accommodating area is possible.

"Provided" is to be understood in particular as specially programmed, designed, and/or equipped.

In particular, a "support force" is to be understood as a force which causes an elastic deformation independently of the second outer side on the hand tool case. The support force preferably counteracts, in at least one operating state, a weight force of the hand tool case, in particular also during an acceleration or deceleration.

Furthermore, it is provided that the charging coil is provided such that energy can be transferred through the second outer side in particular into the case accommodating area, whereby an energy transfer without bare electrical contacts and a protected arrangement of the charging coil are possible. Alternatively, the charging coil could be situated between the second outer side and the case accommodating area. The phrase "through the second outer side" is to be understood in particular to mean that the charging coil transfers the energy as a magnetic alternating field, which penetrates an area of the outer side by more than 50%. In particular, "in the case accommodating area" is to be understood to mean that a charging coil which receives the energy during an energy transfer is situated in the case accommodating area, and advantageously in the hand tool case. The charging coil which receives the energy during a charging operation is preferably situated in the case accommodating area on the second outer side. The term "transferred" is to be understood in particular to mean that the charging coil transmits electrical energy with the aid of a magnetic alternating field to the charging coil situated in the case accommodating area. The charging coil situated in the case accommodating area is preferably part of the hand tool case and/or particularly preferably part of a hand tool battery situated in the hand tool case.

In addition, it is provided that the holding device housing includes a case fastening component which encloses the case accommodating area by at least 10%, advantageously at least 20%, particularly advantageously at least 40%, whereby particularly stable fastening is possible, in particular in spite of an omission of a holding device. The "case fastening component" is to be understood in particular as a component of the holding device housing, which is provided for the purpose of fastening the hand tool case in a form-locked manner, in particular to prohibit movement in directions deviating from a removal direction. In particular, the phrase "enclose by at least 10%" is to be understood to mean that at least 10% of the case accommodating area is situated between the first and/or the second outer side and a plane which is aligned perpendicularly to the removal direction and which the case fastening component intersects. The case fastening component preferably encloses the case accommodating area by more than 180°, particularly preferably by 360°.

The case fastening component is advantageously implemented at least partially in one piece with other areas of the holding device housing. The case fastening component is preferably implemented as collapsible, in particular when a hand tool case is not situated in the case accommodating area. The case fastening component preferably includes a shape with a small tolerance threshold to the hand tool case, which fastens the hand tool case in one operating state, for example, during travel in a motor vehicle.

Furthermore, it is provided that the hand tool case holding device includes a pivot device, which is provided for the purpose of pivotably supporting the charging coil in relation to the first outer side, whereby a small transport size and/or a flexible use is/are possible. Furthermore, by pivoting away the second outer side in the event of a large load, damage due to a possible excessively large load may be avoided. A "pivot device" is to be understood in particular as a device which allows a movement of the charging coil in relation to the first outer side around a pivot axis. The first outer side and the second outer side are preferably aligned at least essentially parallel in a pivoted-in operating state.

Furthermore, it is provided that the hand tool case holding device includes a holding device, which is provided for the purpose of detachably fixing a hand tool case, whereby stable and reliable fastening and comfortable introduction of the hand tool case into the case accommodating area are possible in different arrangements and alignments of the hand tool case holding device. A "holding device" is to be understood in particular as a device which is provided for the purpose, in at least one operating state, of preventing a movement of the hand tool case out of the case accommodating area. The holding device preferably prevents, in at least one operating state, a movement of the hand tool case independently of a direction of the movement. The holding device preferably holds the hand tool case in a force-fit manner and/or advantageously in a form-locked manner at least during a charging operation. In particular, the term "detachable" is to be understood to mean that the holding device fixes the hand tool case in one state and this fixing is separated nondestructively and/or reversibly by an operator in another state. The holding device preferably fixes the hand tool case so it is detachable without tools. The phrase "detachable without tools" is to be understood in particular to mean that a connection of the holding device to the hand tool case is implemented to be detachable manually by an operator. The holding device preferably includes at least one operating element, which detaches a fixing of the hand tool case to the holding device upon an actuation by an operator.

In one advantageous example embodiment of the present invention, it is provided that the holding device includes at least one holding component, which is provided for the purpose of latching the hand tool case, whereby a particularly stable, user-friendly, and in particular automatically closing fastening is possible with a simple design. A "holding component" is to be understood in particular as a arrangement which causes a force to act directly on the tool case in at least one operating state for fixing the tool case. The holding component is preferably implemented as corresponding to a holding component and/or according to a holding component provided in the publication DE 10 2008 058 007 B3. In particular, "latching" is to be understood to mean that a holding component is elastically deflected during a fastening operation of the hand tool case, to subsequently hook behind a corresponding holding component by way of a force acting on the holding component. The elastically deflectable holding component is preferably situated on the hand tool case and the corresponding holding component is situated on the hand tool case holding device.

Furthermore, it is provided that the holding device includes two holding components, which are situated on two opposing sides of the case accommodating area, whereby particularly reliable fastening is possible with a simple design. The phrase "on two opposing sides" is to be understood in particular to mean that the holding components lie such that a straight line, which intersects the case accommodating area and which is at least essentially parallel to one surface of the case accommodating area, passes through both of the holding components.

Furthermore, it is provided that the hand tool case holding device includes a charging electronic system, which is provided for the purpose of at least controlling a charging operation, whereby a charging electronic system situated in the hand tool case may at least be omitted. A particularly simple embodiment of the hand tool case is thus possible. A "charging electronic system" is to be understood in particular as an electronic system which controls and/or preferably regulates an energy transfer to the hand tool battery depending on a charge state of the hand tool battery. The hand tool battery preferably requests a charging power from the charging electronic system.

Furthermore, a system including a hand tool case holding device according to the present invention and at least one hand tool case is provided, which includes at least one holding device corresponding to the holding device of the hand tool case holding device, whereby the hand tool case holding device is advantageously connectable to various hand tool cases. In this context, "corresponding" is to be understood in particular to mean that the holding device of the hand tool case is provided for the purpose of establishing a detachable mechanical connection to the holding device of the hand tool case holding device. The hand tool case preferably includes, in addition to the first holding device, a second holding device, which is implemented as corresponding to a first holding device of a hand tool case, whereby multiple hand tool cases may advantageously be stacked and in particular transported while connected with the aid of the holding devices. The second holding device of the hand tool case is preferably implemented identically to the holding device of the hand tool case holding device.

Further advantages result from the following description of the drawings, in which three exemplary embodiments of the present invention are shown. The drawings, the description, and the claims contain numerous features in combination. Those skilled in the art will advantageously consider the features individually and also in combination to form reasonable further combinations.

DETAILED DESCRIPTION

Figure 1:
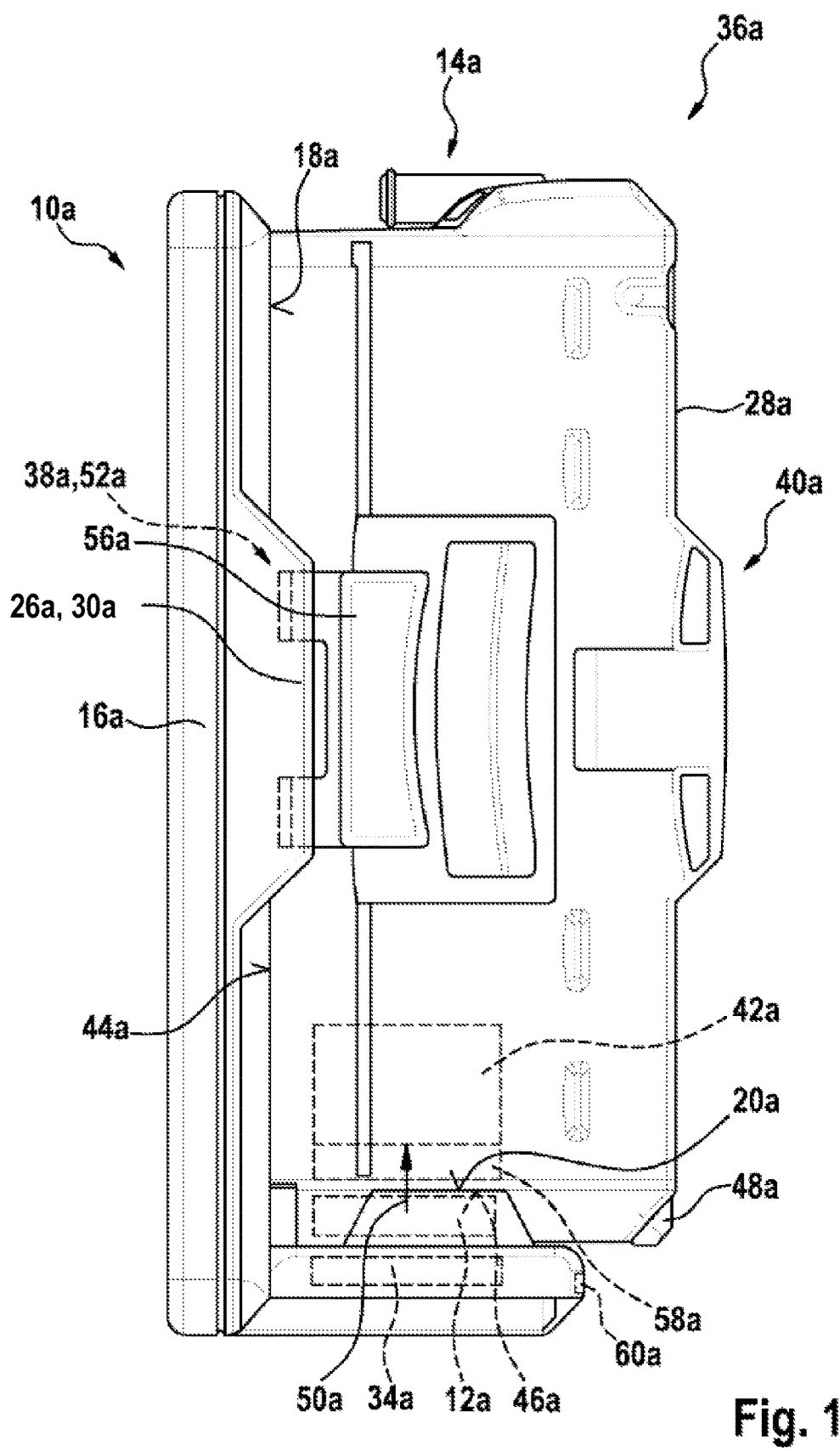
FIG. 1 shows a system including a hand tool case and an L-shaped hand tool case holding device, according to an example embodiment of the present invention.
Figure 2:
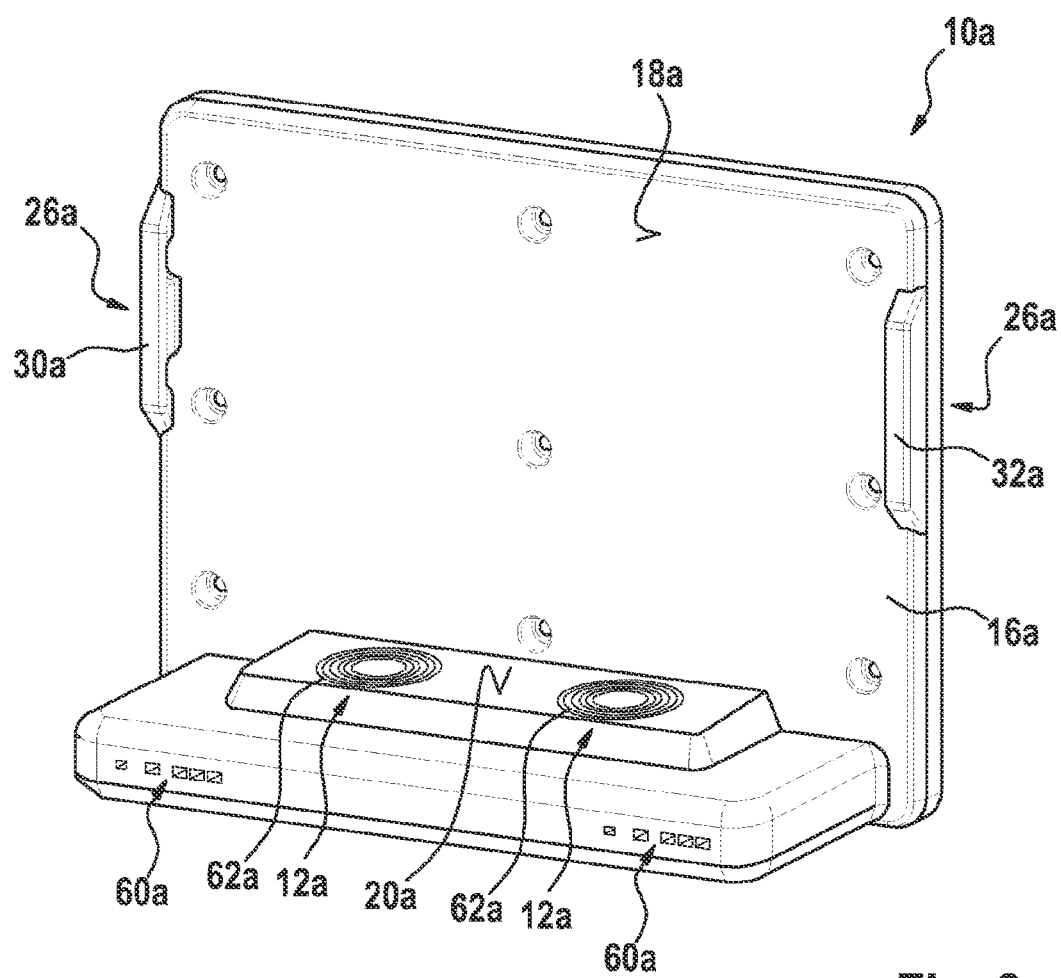
FIG. 2 shows the hand tool case holding device from FIG. 1 in a perspective view.
Figure 3:
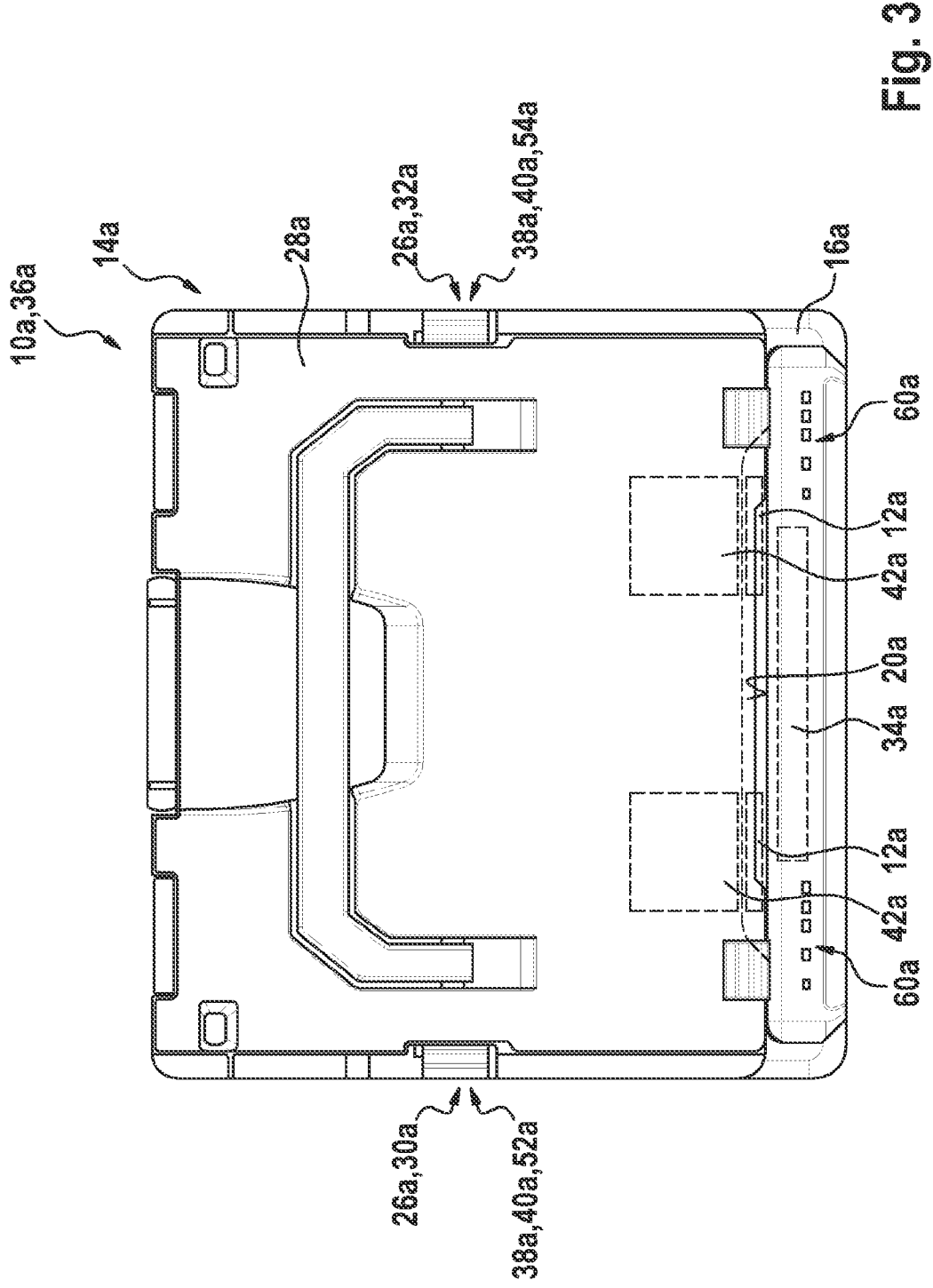
FIG. 3 shows the system from FIG. 1 in a top view.

FIGS. 1 through 3 show a first example embodiment of a system $36a$ according to the present invention, including a hand tool case holding device $10a$, a hand tool case $28a$, and two hand tool batteries $42a$, which are situated during a charging operation in hand tool case $28a$. Hand tool case $28a$ includes a first holding device $38a$ and a second holding device $40a$. First holding device $38a$ of hand tool case $28a$ is connected during a charging operation to a holding device $26a$ of hand tool case holding device $10a$. Therefore, first holding device $38a$ of hand tool case $28a$ and holding device $26a$ of hand tool case holding device $10a$ are implemented cooperatively. Second holding device $40a$ of hand tool case $28a$ is implemented similar to holding device $26a$ of hand tool case holding device $10a$, and is therefore connectable to a first holding device of a further hand tool case (not shown) and/or a further hand tool case holding device $10a$. Hand tool case holding device $10a$ includes for this purpose a second holding device (not shown), which is structured similar to first holding device $38a$ of hand tool case $28a$, and which allows a fixing of a hand tool case on a side facing away from a case accommodating area $14$ of hand tool case holding device $10a$.

Hand tool case holding device $10a$ includes two charging coils $12a$, case accommodating area $14a$, a holding device housing $16a$, and a charging electronic system $34a$. Holding device housing $16a$ includes a first outer side $18a$ and a second outer side $20a$. Outer sides $18a$, $20a$ are aligned facing toward case accommodating area $14a$. Outer sides $18a$, $20a$ each delimit essentially cuboid case accommodating area $14a$ on one respective side. Outer sides $18a$, $20a$ are aligned perpendicularly to one another. Therefore, second outer side $20a$ is provided for the purpose of causing a support force parallel to a plane of first outer side $18a$. First outer side $18a$ is in contact against a base $44a$ of hand tool case $28a$ during a charging operation. Second outer side $20a$ is in contact against one of front sides $46a$ of hand tool case $28a$ during a charging operation. A cover pivot axis $48a$ of hand tool case $28a$ is also situated on this front side $46a$. Alternatively, another side of a hand tool case could also be situated on second outer side $20a$. For example, a first outer side could be in contact against a front side or a cover and a second outer side could be in contact against a base or a cover of a hand tool case.

Charging coils $12a$ are situated on second outer side $20a$. Charging coils $12a$ are in contact against an inner side of a wall of holding device housing $16a$, which is opposite to second outer side $20a$. Action directions $50a$ of charging coils $12a$ are aligned perpendicularly to second outer side $20a$. At least one of charging coils $12a$ transmits energy through second outer side $20a$ into case accommodating area $14a$ during a charging operation.

Holding device $26a$ of hand tool case holding device $10a$ fixes the hand tool case $28a$ so it is detachable without tools. For this purpose, holding device $26a$ includes two holding components $30a$, $32a$, which latch in one operating state with two holding components $52a$, $54a$ of hand tool case $28a$. Holding components $30a$, $32a$ of holding device $26a$ are situated on two opposing sides of case accommodating area $14a$. Holding components $30a$, $32a$ are situated adjoining first outer side $18a$. Alternatively or additionally, the holding components could be situated adjoining second outer side $20a$. The two holding components $52a$, $54a$ of hand tool case $28a$ are spring-mounted. They are deflected during a fastening operation.

Holding components $30a$, $32a$ of hand tool case holding device $10a$ are implemented, for example, as recesses, in which holding components $52a$, $54a$ of hand tool case $28a$ engage with a movement outward. Hand tool case $28a$ may be fixed using a movement direction parallel to first outer side $18a$ and using a movement direction parallel to second outer side $20a$. First holding device $38a$ of hand tool case $28a$ includes an operating element $56a$, with the aid of which an operator may detach a latching connection between hand tool case holding device $10a$ and hand tool case $28a$.

Charging electronic system $34a$ of hand tool case holding device $10a$ is situated in an interior chamber of holding device housing $16a$. Hand tool batteries $42a$ request a charging power at charging electronic system $34a$ during a charging operation. Charging electronic system $34a$ controls a charging power transferred to hand tool batteries $42a$ during the charging operation. For this purpose, charging electronic system $34a$ transfers electrical energy to hand tool battery $42a$ via charging coil $12a$ of hand tool case holding device $10a$ and a charging coil $58a$ of hand tool battery $42a$.

In addition, charging electronic system 34*a* communicates with hand tool battery 42*a* in a suitably appropriate manner according to those skilled in the art, in particular via the charging coil and/or via a transmission path, according to a suitably appropriate protocol according to those skilled in the art. Hand tool case holding device 10*a* includes output components 60*a*, which indicate a charge state to an operator during the charging operation. In addition to a hand tool battery 42*a* situated in hand tool case 28*a*, hand tool case holding device 10*a* may charge a hand tool battery (not shown) placed on second outer side 20*a*. For this purpose, second outer side 20*a* includes a marking 62*a*, which shows a position of charging coils 12*a* on outer side 20*a*.

FIGS. 4 through 7 show two further example embodiments of the present invention. The following descriptions and the drawings are essentially restricted to the differences between the example embodiments, reference fundamentally also being able to be made to the drawings and/or the description of the other example embodiments, in particular FIGS. 1 through 3, with respect to identically identified components, in particular in regard to components having identical reference numerals. To differentiate the example embodiments, the letter 'a' is affixed to the reference numerals of the example embodiments in FIGS. 1 through 3, and, in the example embodiments of FIGS. 4 through 7, the letter 'a' is replaced by the letters 'b' and 'c'.

Figure 4:
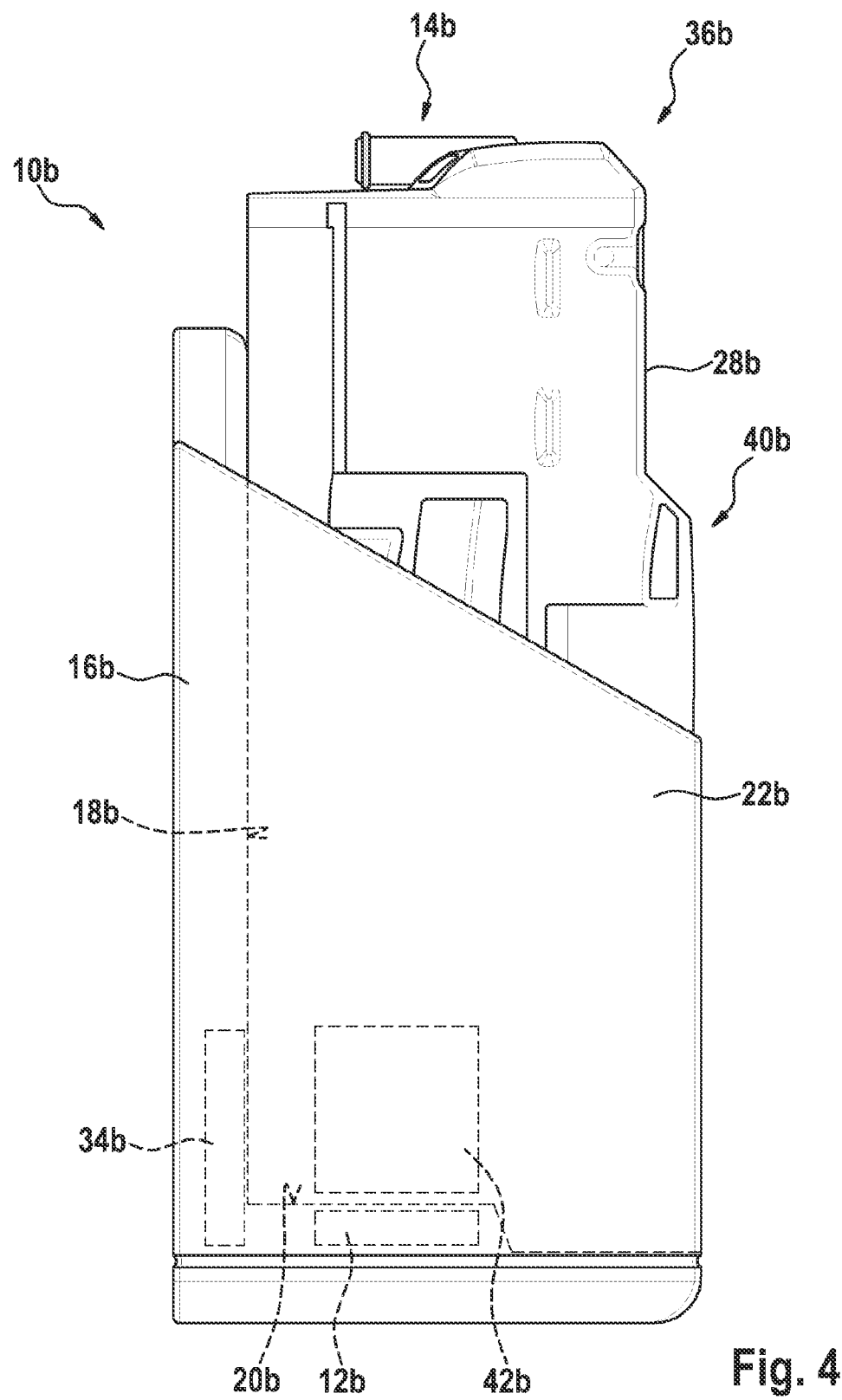
FIG. 4 shows a second example embodiment of the system from FIG. 1 including a hand tool case holding device, which encloses a case accommodating area.
Figure 5:
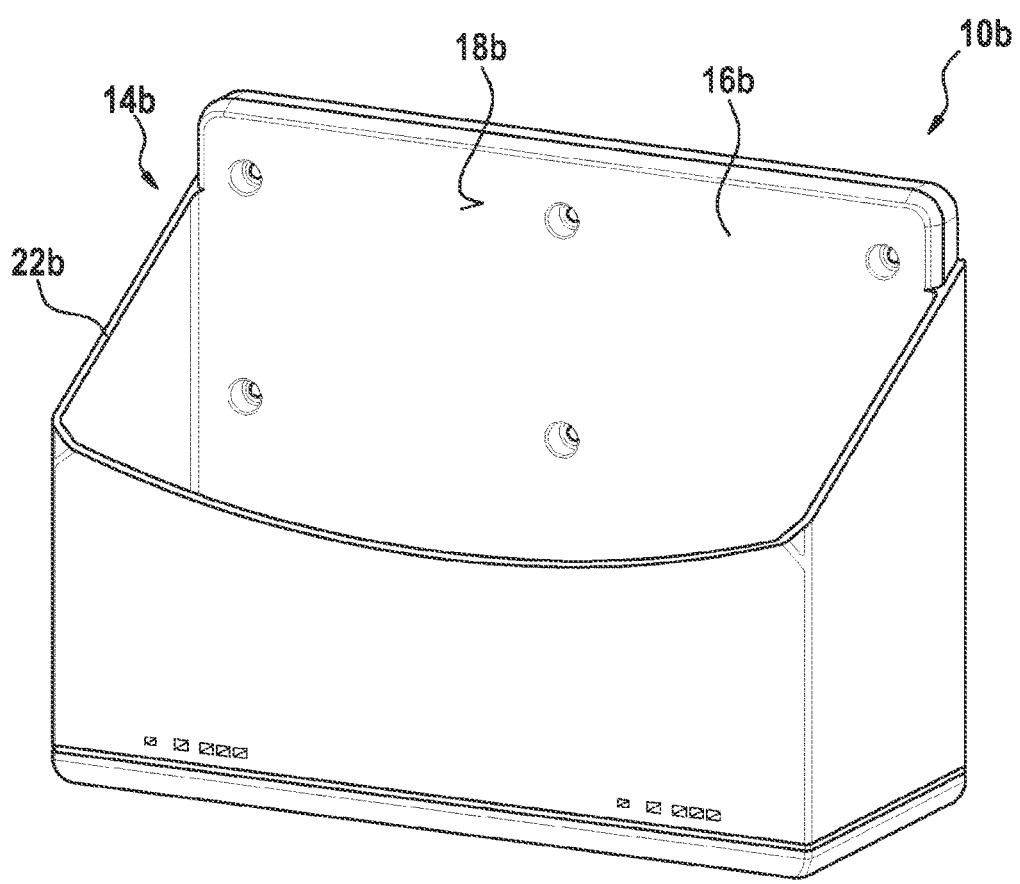
FIG. 5 shows the hand tool case holding device from FIG. 4 in a perspective view.
Figure 6:
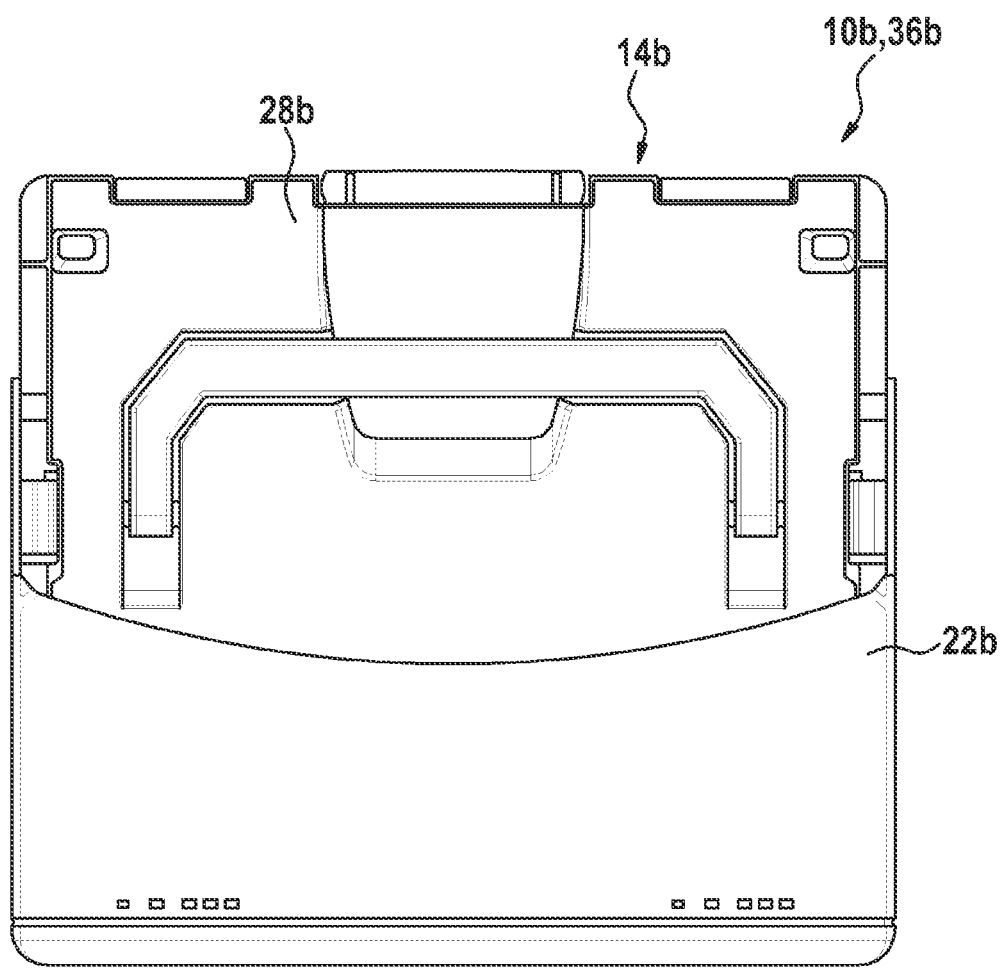
FIG. 6 shows the system from FIG. 4 in a top view.

FIGS. 4 through 6 show a system 36*b* including a hand tool case holding device 10*b*, a hand tool case 28*b*, and a hand tool battery 42*b*, which is situated in hand tool case 28*b* during a charging operation. Hand tool case holding device 10*b* includes a holding device housing 16*b* including a case fastening component 22*b*, which encloses a case accommodating area 14*b* of holding device housing 16*b* by more than 50%. Case fastening component 22*b* encloses case accommodating area 14*b* in a basket shape.

Holding device housing 16*b* includes two outer sides 18*b*, 20*b*, which face toward case accommodating area 14*b*. Outer sides 18*b*, 20*b* are aligned perpendicularly to one another. A charging coil 12*b* of hand tool case holding device 10*b* is situated on one of outer sides 18*b*, 20*b*. Hand tool case 28*b* may be removed by an operator in parallel to one of outer sides 18*b* without an actuation of an operating element.

Figure 7:
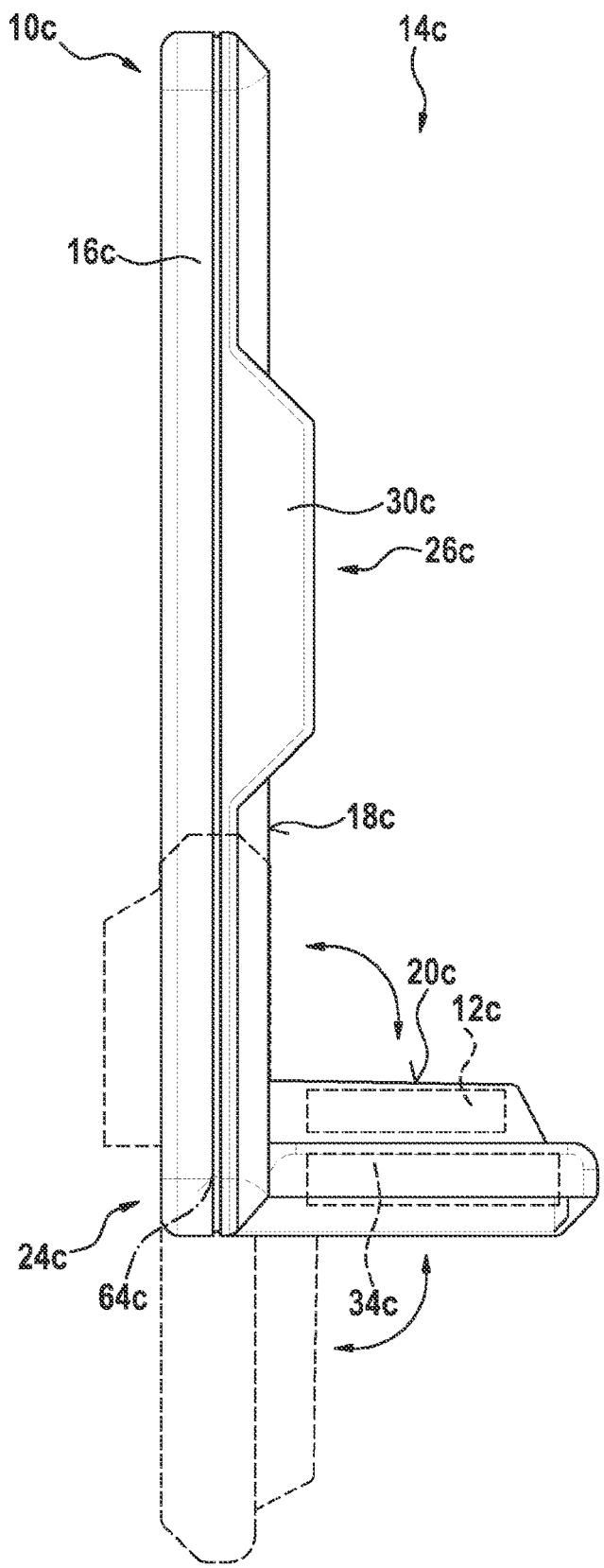
FIG. 7 shows a third example embodiment of the system from FIG. 1 including a hand tool case holding device including a pivotably supported charging coil.

FIG. 7 shows a hand tool case holding device 10*c* of a system according to an example embodiment of the present invention. Hand tool case holding device 10*c* includes a charging coil 12*c*, a first outer side 18*c*, a second outer side 20*c*, a pivot device 24*c*, and a holding device 26*c*. Charging coil 12*c* is situated on second outer side 20*c*. Holding device 26*c* is situated on first outer side 18*c*. Pivot device 24*c* pivotably supports charging coil 12*c* in relation to first outer side 18*c* around a pivot axis 64*c*.

What is claimed is:

1. A hand tool case holding device comprising:
   at least one charging coil; and
   a holding device housing that defines a case accommodating area, wherein:
   a first outer surface of the holding device housing faces toward the case accommodating area;
   in at least one operating state, a second outer surface of the holding device housing faces toward the case accommodating area, wherein the second outer surface is aligned essentially perpendicularly to the first outer surface; and
   a pivot device, which supports the charging coil in at least three positions pivotally relative to the first outer surface around a pivot axis,
   wherein, during a charging operation and when the at least one charging coil is pivoted perpendicular to the first outer surface, the at least one charging coil is configured to transmit energy into the case accommodating area,
   wherein the charging coil is situated on or immediately beneath the second outer surface,
   wherein the holding device housing includes a holding device configured to detachably fix a hand tool case in the case accommodating area, the holding device being arranged on or at the first outer surface and including at least one operating element operable by an operator and configured to fix or release a hand tool case in the case accommodating area.

2. The hand tool case holding device of claim 1, wherein the charging coil is configured to transfer energy through the second outer surface.

3. The hand tool case holding device of claim 1, wherein the holding device housing includes a case fastener, which encloses the case accommodating area by at least 10%.

4. The hand tool case holding device of claim 1, wherein the fixing of the hand tool case in the case accommodating area is by cooperating of a male latching component with a female latching component, one of which is part of the holding device and one of which is part of the hand tool case.

5. The hand tool case holding device of claim 1, wherein the holding device includes two holding components, which are situated opposite each other, one on one side of the case accommodating area and the other on an opposite side of the case accommodating area.

6. The hand tool case holding device of claim 1, further comprising:
   a charging electronic system configured to control a charging operation by the charging coil to charge a component held in the case accommodating area.

7. A system comprising:
   a hand tool case which includes a holding device; and
   a hand tool case holding device that includes:
     at least one charging coil; and
     a holding device housing that defines a case accommodating area;
   wherein:
     a first outer surface of the holding device housing faces toward the case accommodating area;
     in at least one operating state, a second outer surface of the holding device housing faces toward the case accommodating area, wherein the second outer surface is aligned essentially perpendicularly to the first outer surface;
     a pivot device, which supports the charging coil in at least three positions pivotally relative to the first outer surface around a pivot axis,
     wherein, during a charging operation and when the at least one charging coil is pivoted perpendicular to the first outer surface, the at least one charging coil is configured to transmit energy into the case accommodating area,
     wherein the charging coil is situated on or immediately beneath the second outer surface; and
     the holding device housing includes a holding device configured to cooperate with the holding device of the hand tool case to detachably fix the hand tool case in the case accommodating area,
     wherein the holding device housing includes a holding device configured to detachably fix a hand tool case in the case accommodating area, the holding device being arranged on or at the first outer surface and including at least one operating element operable by an operator and configured to fix or release a hand tool case in the case accommodating area.

8. The hand tool case holding device of claim 1, wherein upon fixing the hand tool case in the case accommodating area the first outer surface is in contact against a base of the hand tool case and the second outer surface is in contact against a front side of the hand tool case.

9. The hand tool case holding device of claim 6, wherein the charging electronic system is arranged beneath the second outer surface.

10. The hand tool case holding device of claim 6, wherein the charging electronic system is arranged beneath the charging coil.

11. The hand tool case holding device of claim 1, wherein two charging coils are arranged within a same plane.

12. A hand tool case holding device comprising:
  at least one charging coil; and
  a holding device housing that defines a case accommodating area, wherein:
    a first outer surface of the holding device housing faces toward the case accommodating area;
    in at least one operating state, a second outer surface of the holding device housing faces toward the case accommodating area and is aligned essentially perpendicularly to the first outer surface;
  a pivot device supports the charging coil in at least three positions pivotally relative to the first outer surface around a pivot axis;
  wherein, during a charging operation and when the at least one charging coil is pivoted perpendicular to the first outer surface, the at least one charging coil is configured to transmit energy into the case accommodating area,
  the charging coil is situated on or immediately beneath the second outer surface,
  wherein the holding device housing includes a holding device configured to detachably fix a hand tool case in the case accommodating area,
  wherein the holding device includes two holding components situated opposite each other, wherein one of the holding components is situated on one side of the case accommodating area and the other of the holding components is situated on an opposite side of the case accommodating area.

* * * * *